(12) United States Patent
Tah et al.

(10) Patent No.: US 12,032,846 B1
(45) Date of Patent: Jul. 9, 2024

(54) DATA MIGRATION BETWEEN DEVICES SUPPORTING DIFFERENT STORAGE REQUEST BLOCK PROTOCOLS

(71) Applicant: Dell Products L.P., Round Rock, TX (US)

(72) Inventors: Arnab Tah, Bangalore (IN); Mahalakshmi Sokkalal, Bangalore (IN); Megha Karanth, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/146,754

(22) Filed: Dec. 27, 2022

(51) Int. Cl.
G06F 12/00 (2006.01)
G06F 3/06 (2006.01)

(52) U.S. Cl.
CPC .......... G06F 3/0647 (2013.01); G06F 3/0604 (2013.01); G06F 3/064 (2013.01); G06F 3/067 (2013.01)

(58) Field of Classification Search
CPC ...... G06F 3/0647; G06F 3/0604; G06F 3/064; G06F 3/067
See application file for complete search history.

(56) References Cited

U.S. PATENT DOCUMENTS

| | | | |
|---|---|---|---|
| 9,747,219 B1* | 8/2017 | Bashari | G06F 13/4068 |
| 2016/0054933 A1* | 2/2016 | Haghighi | G06F 12/0638 |
| | | | 711/103 |
| 2018/0032261 A1* | 2/2018 | Singhai | G06F 12/023 |
| 2018/0246817 A1* | 8/2018 | Feehrer | G06F 3/0631 |
| 2019/0370046 A1* | 12/2019 | Bharde | G06F 18/22 |
| 2020/0401346 A1* | 12/2020 | Shimada | G06F 3/0659 |
| 2021/0255784 A1* | 8/2021 | Anchi | G06F 3/0689 |
| 2021/0263665 A1* | 8/2021 | Rao | G06F 13/1668 |
| 2022/0229785 A1* | 7/2022 | Anchi | G06F 3/0647 |

(Continued)

OTHER PUBLICATIONS

Microsoft, "Storage_Request_Block Structure (srb.h)," https://learn.microsoft.com/en-us/windows-hardware/drivers/ddi/srb/ns-srb-_storage_request_block, Sep. 1, 2022, 13 pages.

(Continued)

*Primary Examiner* — Shawn X Gu
*Assistant Examiner* — Mohammad S Hasan
(74) *Attorney, Agent, or Firm* — Ryan, Mason & Lewis, LLP

(57) ABSTRACT

An apparatus comprises a processing device configured to identify data to be migrated from a first device to a second device, the first device comprising a first storage stack supporting a first storage request block protocol. The processing device is also configured to determine whether a second storage stack of the second device supports the first storage request block protocol and, responsive to determining that the second storage stack of the second device does not support the first storage request block protocol, to convert storage request blocks directed to the data to be migrated from a first format of the first storage request block protocol to a second format of a second storage request block protocol. The processing device is further configured to migrate the data to the second device utilizing input-output operations comprising the storage request blocks in the second format of the second storage request block protocol.

20 Claims, 6 Drawing Sheets

(56) References Cited

U.S. PATENT DOCUMENTS

2022/0269433 A1* 8/2022 Pal ..................... G06F 13/4027

OTHER PUBLICATIONS

Microsoft, "Multipath I/O Now Supports Extended Storage Request Blocks," https://learn.microsoft.com/en-us/windows/win32/w8cookbook/multipath-i-o-now-supports-extended-srbs, Sep. 10, 2020, 3 pages.
M. Glaser, "Dell EMC SC Series Storage and Microsoft Multipath I/O," CML1004 Best Practices, Jul. 2019, 36 pages.
M. Glaser, "Dell EMC SC Series: Microsoft Multipath I/O Best Practices," CML1004 Best Practices, Jun. 2019, 58 pages.

* cited by examiner

200

```
typedef struct _SCSI_REQUEST_BLOCK {
USHORT Length; ←Fixed size structure; size of (SCSI_REQUEST_BLOCK)
UCHAR Function; ←Populate from SrbGetSrbFunction(ExSRB)
UCHAR SrbStatus; ←Populate fom SrbGetSrbStatus(ExSRB)
UCHAR ScsiStatus; ←Populate from SrbGetScsiStatus(ExSRB)
UCHAR PathId; ←Populate from SrbGetPathId(ExSRB)
UCHAR TargetId; ←Populate from SrbGetTargetId(ExSRB)
UCHAR Lun; ←Populate from SrbGetLun(ExSRB)
UCHAR QueueTag; ←Populate from SrbGetQueueTag(ExSRB)
UCHAR QueueAction; ←Populate from SrbGetQueueAction(ExSRB)
UCHAR CdbLength; ←Populate from SrbGetCdbLength(ExSRB)
UCHAR SenseInfoBufferLength; ←Populate from SrbGetSensoInfoBufferLength(ExSRB)
ULONG SrbFlags; ←Populate from SrbGetSrbFlags(ExSRB)
ULONG DataTransferLength; ←Populate from SrbGetDataTransferLength(ExSRB)
ULONG TimeOutValue; ←Populate from SrbGetTimeOutValue(ExSRB)
PVOID DataBuffer; ←Populate from SrbGetDataBuffer(ExSRB)
PVOID SenseInfoBuffer; ←Populate from SrbGetSenseInfoBuffer(ExSRB)
struct _SCSI_REQUEST_BLOCK*NextSrb; ←In the case where an incoming Extended
SRB structure is chained, multiple SCSI_REQUEST_BLOCK structures are allocated and
connected through this parameter PVOID OriginalRequest; ←Populate from SrbGetOriginalRequest(ExSRB)
PBOID SrbExtension; ←Populate from SrbGetMiniportContext(ExSRB)
union {
       ULONG InternalStatus; ←Populate from SrbGetSystemStatus(ExSRB)
       ULONG QueueSortKey;
       ULONG LinkTimeoutValue;
};
ULONG Reserved;
UCHAR Cdb[16]; ←Populate from SrbGetCdb(ExSRB)
} SCSI_REQUEST_BLOCK, *PSCSI_REQUEST_BLOCK;
```

FIG. 2

DATA MIGRATION BETWEEN DEVICES SUPPORTING DIFFERENT STORAGE REQUEST BLOCK PROTOCOLS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments of the present disclosure provide techniques for data migration between devices supporting different storage request block protocols.

In one embodiment, an apparatus comprises at least one processing device comprising a processor coupled to a memory. The at least one processing device is configured to perform the steps of identifying data to be migrated from a first device to a second device, wherein the first device comprises a first storage stack supporting a first storage request block protocol, and determining whether a second storage stack of the second device supports the first storage request block protocol. The at least one processing device is also configured, responsive to determining that the second storage stack of the second device does not support the first storage request block protocol, to perform the step of converting one or more storage request blocks directed to the data to be migrated from a first format of the first storage request block protocol to a second format of a second storage request block protocol. The at least one processing device is further configured to perform the step of migrating the data from the first device to the second device utilizing one or more input-output operations comprising the one or more storage request blocks in the second format of the second storage request block protocol.

These and other illustrative embodiments include, without limitation, methods, apparatus, networks, systems and processor-readable storage media.

BRIEF DESCRIPTION OF THE DRAWINGS

FIG. 2 shows pseudocode of a legacy storage request block structure format with fields mapped to an extended storage request block structure format in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
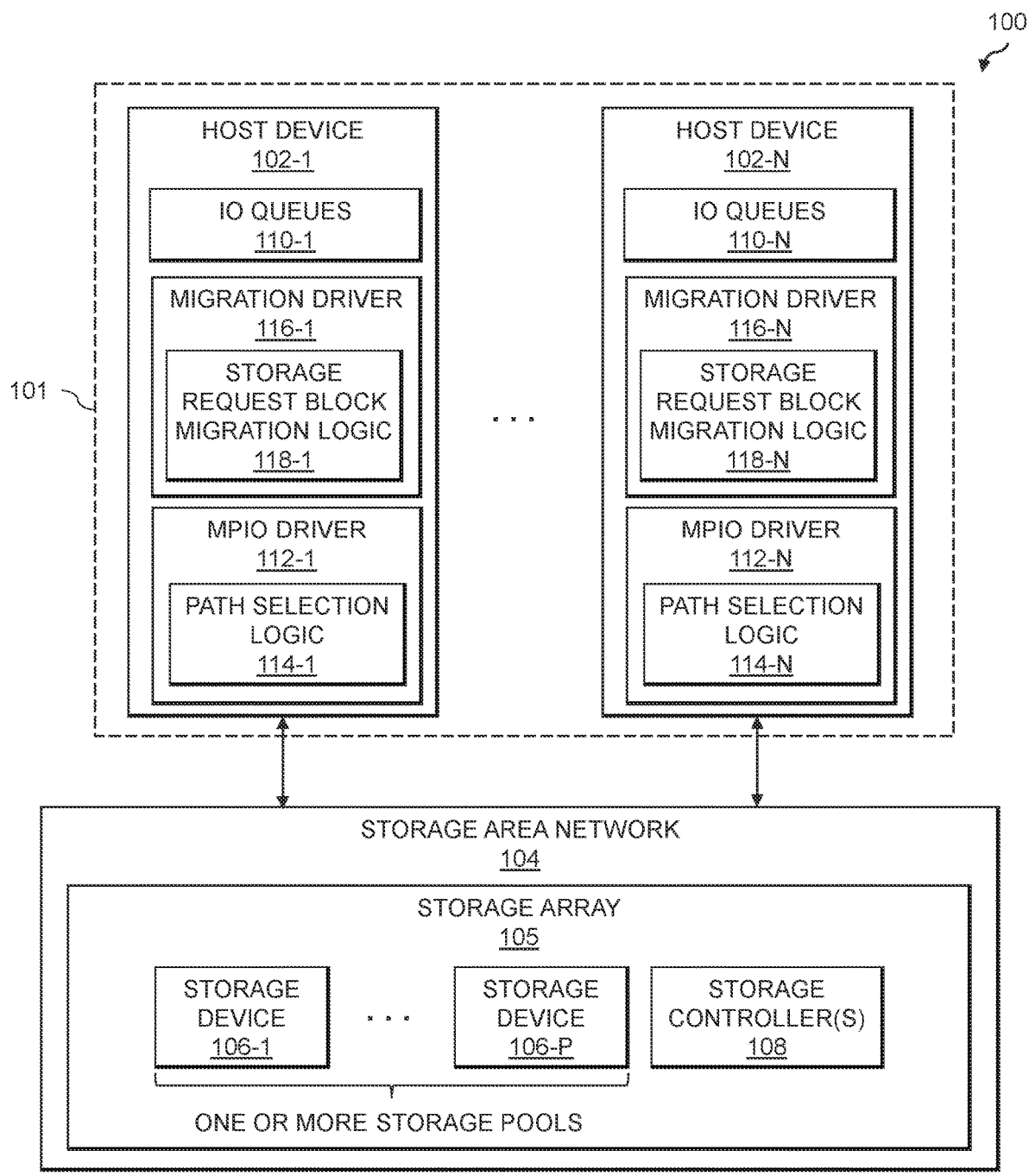
FIG. 1 is a block diagram of an information processing system configured for data migration between devices supporting different storage request block protocols in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N (collectively, host devices 102), where N is an integer greater than or equal to two. The host devices 102 communicate over a storage area network (SAN) 104 with at least one storage array 105. The storage array 105 comprises a plurality of storage devices 106-1, . . . 106-P (collectively, storage devices 106) each storing data utilized by one or more applications running on one or more of the host devices 102, where P is also an integer greater than or equal to two. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, . . . 110-N (collectively, IO queues 110) and respective multi-path input-output (MPIO) drivers 112-1, . . . 112-N (collectively, MPIO drivers 112). The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N (collectively, path selection logic 114) implemented within the MPIO drivers 112. The host devices 102 also comprise respective migration drivers 116-1, . . . 116-N (collectively, migration drivers 116) which are configured to perform data migration operations utilizing storage request block (SRB) migration logic 118-1, . . . 118-N (collectively, SRB migration logic 118).

The MPIO drivers 112 may comprise, for example, otherwise conventional MPIO drivers, such as PowerPath® drivers from Dell Technologies, suitably modified in the manner disclosed herein. Similarly, the migration drivers 116 may comprise otherwise conventional migration drivers suitably modified in the manner disclosed herein to provide functionality for data migration between devices supporting different storage request block protocols. Other types of MPIO and migration drivers from other driver vendors may be suitably modified to incorporate functionality for data migration between devices supporting different storage request block protocols as disclosed herein.

The terms "MPIO driver" and "migration driver" as used herein are intended to be broadly construed, and such a component is illustratively implemented at least in part as a combination of software and hardware. For example, one or more of the MPIO drivers 112 and/or migration drivers 116 can comprise one or more software programs running on a hardware processor of one or more of the host devices 102.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate. The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates such as 1G, 2G, 4G, 8G, 16G, 32G, etc., where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec.

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to determine IO processing performance for each of at least a subset of the paths, and to dynamically adjust a path selection algorithm, utilized by the path selection logic 114-1 in selecting particular ones of the paths for delivery of the IO operations from the host device 102-1 to the storage array 105, based at least in part on the determined performance.

In determining IO processing performance of respective paths, the MPIO driver 112-1 obtains information such as, for example, response times or other latency measures of the respective paths. This information is illustratively referred to in the context of some embodiments herein as "path condition information," although other types of information can be used in other embodiments. Dynamic control of one or more path selection algorithms is therefore performed in some embodiments using latency measures.

The above-noted process of determining IO processing performance for each of at least a subset of the paths and dynamically adjusting a path selection algorithm utilized in selecting particular ones of the paths for delivery of the IO operations from the host device to the storage array 105 based at least in part on the determined performance are illustratively repeated in each of a plurality of intervals. The particular duration of such time periods can be a user-configurable parameter, or set by default, and can vary depending upon factors such as the desired resolution of the IO processing performance information and the amount of overhead required to determine that information.

In the FIG. 1 embodiment, the storage array 105 comprises one or more storage controllers 108. The storage controllers 108 may maintain per-port IO processing information. Such per-port IO processing information is illustratively collected by the storage array 105, and in some embodiments may be provided to one or more of the host devices 102 for use in conjunction with path selection.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others.

The MPIO driver 112-1 on the host device 102-1 may have connectivity to an MPIO management station (not shown in FIG. 1), where the MPIO management station in some embodiments implements PowerPath® Management Appliance (PPMA) functionality. The MPIO driver 112-1 can obtain from the MPIO management station certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station. Such host multi-pathing software can be configured to facilitate logical storage device access as disclosed herein.

The Extended Storage Request Block (ExSRB) protocol is a type of Storage Request Block (SRB) protocol which is supported in various devices, including in Microsoft Windows devices from Microsoft Windows 2012 R2 onwards.

There are, however, block-based storage devices that do not support ExSRB and only support an SCSI Request Block, also referred to herein as legacy SRB. In the ExSRB protocol, STORAGE_REQUEST_BLOCK replaces the SCSI_REQUEST_BLOCK of the legacy SRB protocol in the core storage stack. The STORAGE_REQUEST_BLOCK of the ExSRB protocol replicates the functionality of the SCSI_REQUEST_BLOCK in the legacy SRB protocol carrying SCSI requests. The STORAGE_REQUEST_BLOCK of the ExSRB protocol is also extensible and scalable, and is capable of carrying not just SCSI payloads but also NVMe CDB as well. In order to support the ExSRB protocol in the storage stack, all the drivers in the storage stack should support the ExSRB protocol. In cases where one of the drivers in the storage stack below the Disk Class Driver does not support the ExSRB protocol, the Disk Class Driver will fail back to the legacy SRB protocol. This fail back behavior can cause major issues during data migration between storage device stacks supporting the ExSRB and legacy SRB protocols.

As noted above, the host devices 102 include migration drivers 116 implementing SRB migration logic 118, which are configured to perform data migration operations. The host device 102-1 may have a storage stack which adds support for the ExSRB protocol as a prerequisite for native NVMe support. The legacy SRB protocol is capable of carrying fixed 16-byte CDB. There are issues, however, during migration of data from FC to iSCSI devices (e.g., in a Windows operating environment). In the course of data migration from FC to iSCSI devices, when the migration driver 116-1 attempts to clone IOs from a source (e.g., FC) device to a target (e.g., iSCSI) device, the IO fails on the target device as the Windows iSCSI driver is not capable of handling the ExSRB protocol. Similar issues are observed during data migration in other scenarios where the storage stack of the source storage system supports the ExSRB protocol but the storage stack of the target storage system does not support the ExSRB protocol (e.g., such as data migration during FC to Dell PowerFlex® device migration, where the PowerFlex® driver does not support the ExSRB protocol yet). As the Windows iSCSI driver has not been updated to add support for the ExSRB protocol, there is a need for handling data migration between Windows storage stacks which do and do not support the ExSRB protocol. More generally, there is a need for handling data migration between storage systems which do and do not support the ExSRB protocol. Illustrative embodiments provide technical solutions that enable seamless data migration between storage systems with storage software stacks which do and do not support the ExSRB protocol through the SRB migration logic 118-1 of the migration driver 116-1.

When data migration is to be performed from a source device or storage system that supports the ExSRB protocol, the SRB migration logic 118-1 makes a determination as to whether the target device or storage system (e.g., to which data is to be migrated) also supports the ExSRB protocol. If so, no additional processing is needed. If, however, the target device or storage system's drivers (more generally, its software storage stack) only supports the legacy SRB protocol, further processing is needed to enable the data migration. In some embodiments, such further processing includes the SRB migration logic 118-1 converting IOs in the ExSRB protocol into the legacy SRB protocol during IO cloning in the data migration process. During device configuration, the migration driver 116-1 will determine whether the whole storage stack of a device (e.g., associated with a HBA port) supports the ExSRB protocol or only the legacy SRB protocol. To do so, for example, the Microsoft Windows "ClassPnP" driver (e.g., a SCSI system driver for connecting and transferring data between plug-and-play (PnP) devices) may be used to find out if the whole storage stack supports the ExSRB protocol by way of an Input/Output Control (IOCTL) call "IOCTL_STORAGE_QUERY_PROPERTY." The migration driver 116-1 can use this mechanism to figure out ExSRB protocol support capability, and the result can be stored in a flag inside a device-specific object during device configuration. Later, during IO cloning in the midst of data migration, a data migration utility may utilize SRB migration logic 118-1 to determine from the device-specific object flag that the source device or storage system (e.g., the storage stack of the source device or storage system) supports the ExSRB protocol but the target device or storage system (e.g., the storage stack of the target device or storage system) only supports the legacy SRB protocol, then ExSRB protocol IOs are converted into legacy SRB protocol IOs before dispatch onto the target device or storage system.

Figure 3:
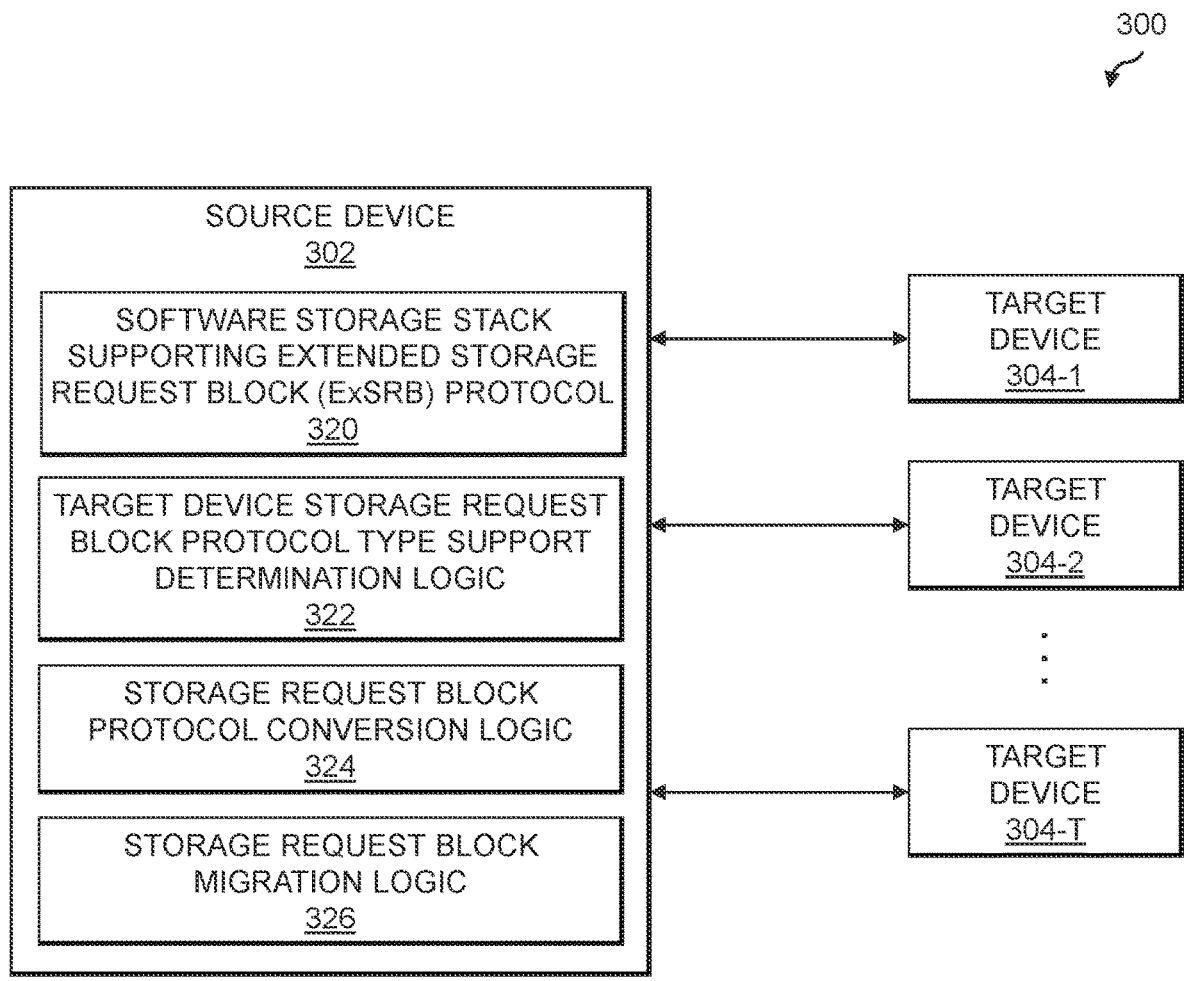
FIG. 3 shows a source device configured for data migration to target devices supporting different storage request block protocols in an illustrative embodiment.

FIG. 2 shows psuedocode 200 illustrating fields for the legacy SRB protocol (e.g., struct SCSI_REQUEST_BLOCK) and their mappings to fields of the ExSRB protocol. Given a pointer to an ExSRB protocol structure, using the inlines defined in srbhelper.h, corresponding fields in a legacy SRB protocol structure can be populated as illustrated in the pseudocode 200 of FIG. 2. Srbhelper.h is header file which has inlines that work well with both pointers to ExSRB and legacy SRB structures. In this case, a pointer to the ExSRB structure with the various inlines is passed to fetch specific field values from the structure (e.g., Function, Status, PathID, TargetId, Lun, etc. as shown in FIG. 3), with such fetched fields being used to initialize corresponding fields in the legacy SRB structure. Memory can then be allocated for an SCSI_REQUEST_BLOCK structure (e.g., for the legacy SRB protocol) and a STORAGE_REQUEST_BLOCK (e.g., for the ExSRB protocol) can be converted into the SCSI_REQUEST_BLOCK structure. The SRB migration logic 118 of the migration driver 116-1 may use the ClassPnp routine called ClasspConverToScsiRequestBlock( ) for the purpose of converting a STORAGE_REQUEST_BLOCK in ExSRB to a SCSI_REQUEST_BLOCK in legacy SRB.

An alternate approach is to make the storage stack supporting the ExSRB protocol (e.g., of the source device or storage system) fall back to using the legacy SRB protocol when a migration utility, via the SRB migration logic 118-1, finds out that the storage stack of the source device or storage system supports ExSRB but the storage stack of the target device or storage system only supports legacy SRB. With necessary capability support from a device operating system (e.g., from a Microsoft Windows OS), the SRB migration logic 118-1 of the migration driver 116-1 can utilize a Device Specific Module (DSM) to tell that it is not ExSRB compatible dynamically, even if it is built with DSM Type6. Then, in the registry or some other host setting, the SRB migration logic 118-1 of the migration driver 116-1 can set that the ExSRB feature shouldn't be used in the host.

After data is migrated from the source device or storage system (e.g., having the storage stack which supports the ExSRB protocol) to the target device or storage system (e.g., having the storage stack which only supports the legacy SRB protocol), the SRB migration logic 118-1 of the migration driver 118-1 will continue to convert IOs from ExSRB to legacy SRB for legacy SRB capable devices. Even after migration is completed, the SRB migration logic 118-1 implemented on the migration driver 116-1 in the IO path of both the source and target devices will continue to convert ExSRB to legacy SRB until a host reboot happens. After host reboot, the legacy SRB capable devices will receive the SRBs properly from the disk class driver itself, and there is no need for the SRB migration logic 118-1 of the migration driver 116-1 to convert ExSRB to legacy SRB.

It should be noted that various logic components (e.g., path selection logic 114, SRB migration logic 118, etc.) disclosed herein can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on an MPIO management station, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 108 has a different local cache or a different allocated portion of a global cache associated therewith, although numerous alternative arrangements are possible. The storage controllers 108 can be implemented as respective storage processors, directors or other storage system components configured to control storage system operations relating to processing of IO operations.

It is assumed that each of the other MPIO drivers 112 and migration drivers 116 is configured in a manner similar to that described above and elsewhere herein for the first MPIO driver 112-1 and the first migration driver 116-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and the migration drivers 116 of such other host devices are each similarly configured to perform data migration operations.

Accordingly, functionality described above in the context of the first MPIO driver 112-1 and the first migration driver 116-1 of the first host device 102-1 is assumed to be similarly performed by each of the other MPIO drivers 112 and migration drivers 116 of the other host devices 102.

The MPIO drivers 112 and migration drivers 116 may be otherwise configured utilizing well-known multi-pathing and data migration functionality. Such conventional multi-pathing and data migration functionality is suitably modified in illustrative embodiments disclosed herein to support data migration between devices supporting different SRB protocols. It should be appreciated that although shown as separate in the FIG. 1 embodiment, in some cases the functionality of the MPIO drivers 112 and the migration drivers 116 may be combined into a single driver. The MPIO drivers 112 and the migration drivers 116 may collectively provide at least a portion of the storage stacks of the host devices 102. The functionality described herein with respective to the MPIO drivers 112 and the migration drivers 116 may, in some cases, be orchestrated or controlled by a single piece of software that implements the path selection logic 114 as well as the SRB migration logic 116 (e.g., such as Power-Path® software).

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

Additional examples of processing platforms utilized to implement portions of the system 100 in illustrative embodiments will be described in more detail below in conjunction with FIGS. 5 and 6.

Although not explicitly shown in FIG. 1, one or more input-output devices such as keyboards, displays or other types of input-output devices may be used to support one or more user interfaces to various components of the FIG. 1 system, as well as to support communication between such components and other related systems and devices not explicitly shown.

It is to be appreciated that these and other features of illustrative embodiments are presented by way of example only, and should not be construed as limiting in any way. Accordingly, different numbers, types and arrangements of system components such as support platform 122, host devices 102, SAN 104, storage array 105, storage devices 106, sets of IO queues 110, MPIO drivers 112 (including their corresponding instances of path selection logic 114), migration drivers 116 (including their corresponding instances of SRB migration logic 118) can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

FIG. 3 shows a system 300 including a source device 302 comprising a storage stack 320 supporting the ExSRB protocol. The source device 302 is assumed to have data, in the form of at least one STORAGE_REQUEST_BLOCK in the ExSRB protocol, that is to be migrated to at least one of a set of target devices 304-1, 304-2, . . . 304-T (collectively, target devices 304). The source device 302 implements target device SRB protocol type support determination logic 322, SRB protocol conversion logic 324 and SRB migration logic 326. The SRB protocol type support determination logic 322 is configured to determine, for a given STORAGE_REQUEST_BLOCK in the ExSRB protocol that is to be migrated to a given one of the target devices 302-1, whether the storage stack of the target device 304-1 supports the ExSRB protocol. If the target device 304-1 supports the ExSRB protocol, then the source device 302 uses the SRB migration logic 326 to migrate the given STORAGE_REQUEST_BLOCK in the ExSRB protocol as-is to the target device 304-1. If, however, the target device 304-1 does not support the ExSRB protocol (e.g., the target device 304-1 only supports the legacy SRB protocol), then the source device 302 utilizes the SRB protocol conversion logic 324 to convert the given STORAGE_REQUEST_BLOCK in the ExSRB protocol to at least one SCSI_REQUEST_BLOCK in the legacy SRB protocol. The source device 302 then uses the SRB migration logic 326 to migrate the given STORAGE_REQUEST_BLOCK in the ExSRB protocol to the target device 304-1 in the form of the at least one SCSI_REQUEST_BLOCK in the legacy SRB protocol.

The source device 302 and target devices 304 may represent respective storage systems, host devices, etc. In some embodiments, it is assumed that the source device 302 and the target devices 304 are part of different SANs. For example, the source device 302 may be part of a FC-based SAN, while one or more of the target devices 304 are part of a iSCSI-based SAN. In some embodiments, the target device SRB protocol type support determination logic 322, SRB protocol conversion logic 324 and SRB migration logic 326 are implemented by a migration driver of the source device 302 (e.g., such as the migration driver 116-1 of the host devices 102-1 via the SRB migration logic 118-1).

Figure 4:
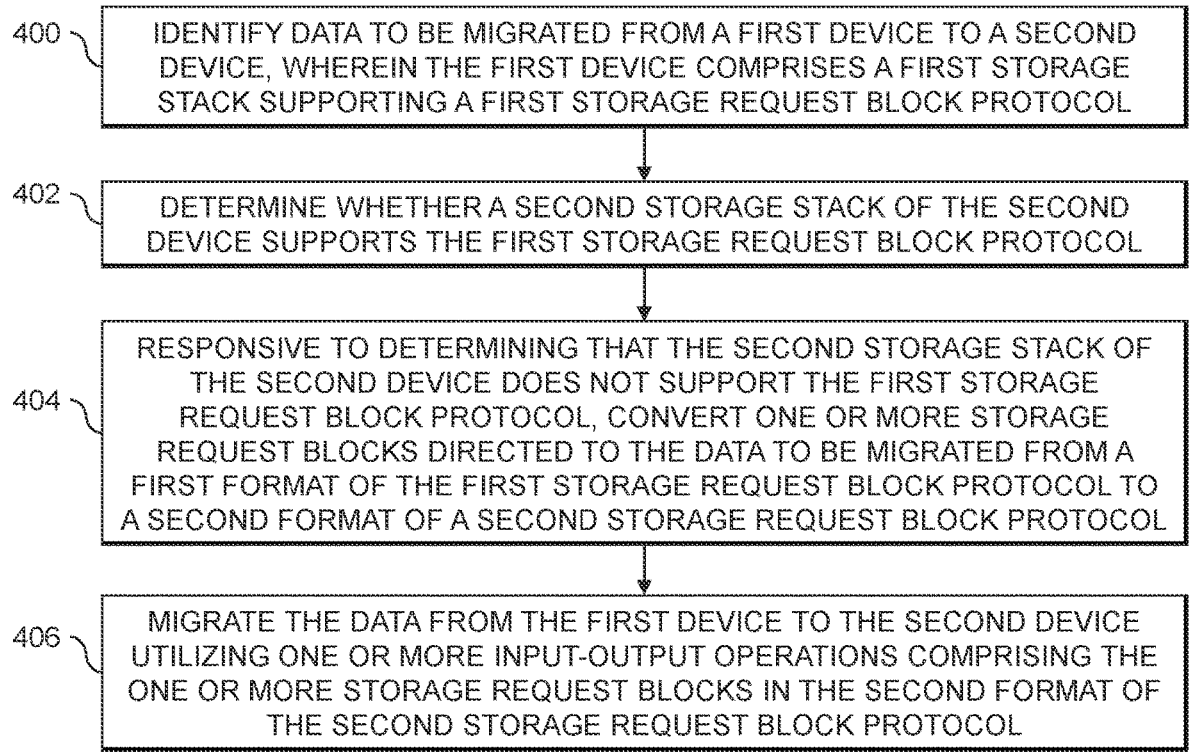
FIG. 4 is a flow diagram of an exemplary process for data migration between devices supporting different storage request block protocols in an illustrative embodiment.

An exemplary process for data migration between devices supporting different storage request block protocols will now be described in more detail with reference to the flow diagram of FIG. 4. It is to be understood that this particular process is only an example, and that additional or alternative processes for data migration between devices supporting different storage request block protocols may be used in other embodiments.

In this embodiment, the process includes steps 400 through 406. The FIG. 4 process is assumed to be performed utilizing the SRB migration logic 118-1 or utilizing the target device SRB protocol type support determination logic 322, SRB protocol conversion logic 324 and SRB migration logic 326. The FIG. 4 process begins with step 400, identifying data to be migrated from a first device to a second device, wherein the first device comprises a first storage stack supporting a first SRB protocol (e.g., the ExSRB protocol). The first device may be a first storage device of a storage system and the second device may be a second storage device of the same storage system. The first device may instead be part of a first storage system and the second device may be part of a second storage system different than the first storage system. In some embodiments, the first device is part of a first SAN and the second device is part of a second SAN. The first SAN may comprise a FC-based SAN and the second SAN may comprise an iSCSI-based SAN.

In step 402, a determination is made as to whether a second storage stack of the second device supports the first SRB protocol. Step 402 may utilize an IOTCL call of a SCSI system driver for connecting and transferring data between PnP devices (e.g., a ClassPnP system driver) to determine a storage query property of the second device. In some embodiments, step 402 is performed during a path discovery scan operation and includes, during a device configuration operation for the second device performed in response to discovering one or more paths to the second device during the path discovery scan operation, storing a flag value in a device-specific object maintained for the second device, the flag value indicating whether the first SRB protocol is supported.

Responsive to determining that the second storage stack of the second device does not support the first SRB protocol, one or more SRBs directed to the data to be migrated are converted from a first format of the first SRB protocol to a second format of a second SRB protocol (e.g., a legacy SRB protocol) in step 404. Step 404 may include, for a given one of the one or more SRBs in the first format of the first SRB protocol: allocating a temporary memory structure for a given SRB in the second format of the second SRB protocol; determining a mapping between one or more fields of the first format of the first SRB protocol and one or more fields of the second format of the second SRB protocol; and utilizing the determined mapping to populate, in the allocated memory structure, the one or more fields in the given SRB in the second format of the second SRB protocol. Step 404 may also or alternatively include, for a given one of the one or more SRBs in the first format of the first SRB protocol, calling a routine of an SCSI system driver to convert the given SRB from the first format of the first SRB protocol to the second format of the second SRB protocol.

In step 406, the data is migrated from the first device to the second device utilizing one or more IO operations comprising the one or more SRBs in the second format of the second SRB protocol. The FIG. 4 process may further include, subsequent to migration of the data from the source device to the target device and until a host performing the FIG. 4 process is rebooted, converting additional IO operations directed to the migrated data from utilizing SRBs in the first format of the first SRB protocol to utilizing SRBs in the second format of the second SRB protocol.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data migration between devices supporting different storage request block protocols will now be described in greater detail with reference to FIGS. 5 and 6. Although described in the context of system 100, these platforms may also be used to implement at least portions of other information processing systems in other embodiments.

Figure 5:
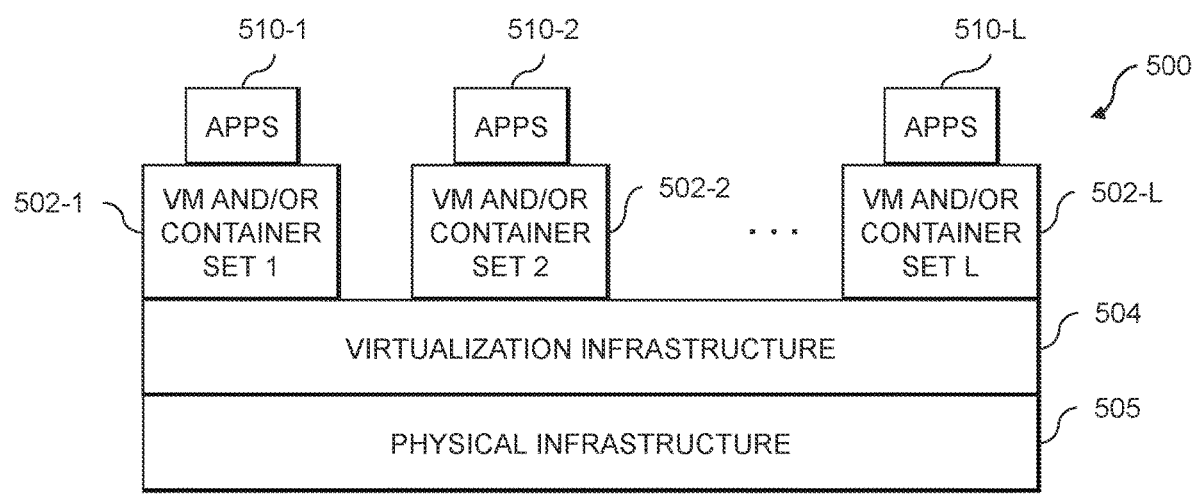
FIGS. 5 and 6 show examples of processing platforms that may be utilized to implement at least a portion of an information processing system in illustrative embodiments.
Figure 6:
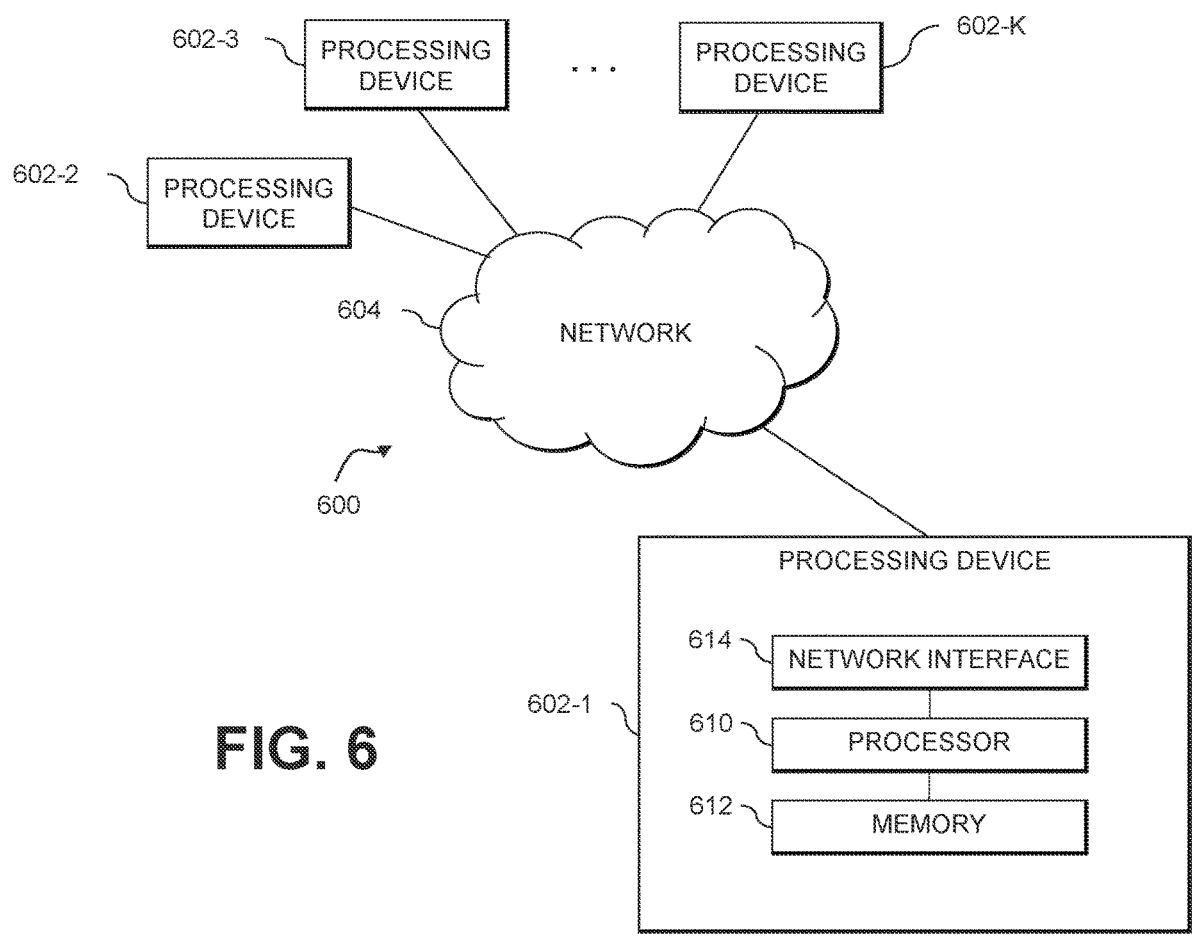

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data migration between devices supporting different storage request block protocols as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, issue analysis techniques, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
identifying data to be migrated from a first device to a second device, wherein the first device comprises a first storage stack supporting a first storage request block protocol;
determining whether a second storage stack of the second device supports the first storage request block protocol;
responsive to determining that the second storage stack of the second device does not support the first storage request block protocol, converting one or more storage request blocks directed to the data to be migrated from a first format of the first storage request block protocol to a second format of a second storage request block protocol;
migrating the data from the first device to the second device utilizing one or more input-output operations comprising the one or more storage request blocks in the second format of the second storage request block protocol; and
converting, subsequent to migration of the data from the first device to the second device and until at least one designated stopping condition is triggered, one or more additional input-output operations directed to the migrated data from utilizing storage request blocks in the first format of the first storage request block protocol to utilizing storage request blocks in the second format of the second storage request block protocol.

2. The apparatus of claim 1 wherein the first device comprises a first storage device of a storage system and the second device comprises a second storage device of the storage system.

3. The apparatus of claim 1 wherein the first device comprises a first storage system and the second device comprises a second storage system different than the first storage system.

4. The apparatus of claim 1 wherein the first device is part of a first storage area network and the second device is part of a second storage area network.

5. The apparatus of claim 4 wherein the first storage area network comprises a Fibre Channel-based storage area network and the second storage area network comprises an Internet Small Computer System Interface-based storage area network.

6. The apparatus of claim 1 wherein the first storage request block protocol comprises an extended storage request block protocol and the second storage request block protocol comprises a legacy storage request block protocol.

7. The apparatus of claim 1 wherein determining whether the second storage stack of the second device supports the first storage request block protocol comprises utilizing an input-output control call of a system driver for connecting and transferring data between plug-and-play devices to determine a storage query property of the second device.

8. The apparatus of claim 1 wherein determining whether the second storage stack of the second device supports the first storage request block protocol is performed during a path discovery scan operation.

9. The apparatus of claim 8 wherein determining whether the second storage stack of the second device supports the first storage request block protocol comprises, during a device configuration operation for the second device performed in response to discovering one or more paths to the second device during the path discovery scan operation, storing a flag value in a device-specific object maintained for the second device, the flag value indicating whether the first storage request block protocol is supported.

10. An apparatus comprising:
at least one processing device comprising a processor coupled to a memory;
the at least one processing device being configured to perform steps of:
identifying data to be migrated from a first device to a second device, wherein the first device comprises a first storage stack supporting a first storage request block protocol;
determining whether a second storage stack of the second device supports the first storage request block protocol;
responsive to determining that the second storage stack of the second device does not support the first storage request block protocol, converting one or more storage request blocks directed to the data to be migrated from a first format of the first storage request block protocol to a second format of a second storage request block protocol; and
migrating the data from the first device to the second device utilizing one or more input-output operations comprising the one or more storage request blocks in the second format of the second storage request block protocol;
wherein converting the one or more storage request blocks directed to the data to be migrated from the first format of the first storage request block protocol to the second format of the second storage request block protocol comprises, for a given one of the one or more storage request blocks in the first format of the first storage request block protocol:
allocating a temporary memory structure for a given storage request block in the second format of the second storage request block protocol;
determining a mapping between one or more fields of the first format of the first storage request block protocol and one or more fields of the second format of the second storage request block protocol; and
utilizing the determined mapping to populate, in the allocated temporary memory structure, the one or more fields in the given storage request block in the second format of the second storage request block protocol.

11. The apparatus of claim 1 wherein converting the one or more storage request blocks directed to the data to be migrated from the first format of the first storage request block protocol to the second format of the second storage request block protocol comprises, for a given one of the one or more storage request blocks in the first format of the first storage request block protocol, calling a routine of a system driver to convert the given storage request block from the first format of the first storage request block protocol to the second format of the second storage request block protocol.

12. The apparatus of claim 1 wherein the at least one designated stopping condition comprises a reboot of the at least one processing device.

13. A method comprising:
identifying data to be migrated from a first device to a second device, wherein the first device comprises a first storage stack supporting a first storage request block protocol;
determining whether a second storage stack of the second device supports the first storage request block protocol;
responsive to determining that the second storage stack of the second device does not support the first storage request block protocol, converting one or more storage request blocks directed to the data to be migrated from a first format of the first storage request block protocol to a second format of a second storage request block protocol;
migrating the data from the first device to the second device utilizing one or more input-output operations comprising the one or more storage request blocks in the second format of the second storage request block protocol;
converting, subsequent to migration of the data from the first device to the second device and until at least one designated stopping condition is triggered, one or more additional input-output operations directed to the migrated data from utilizing storage request blocks in the first format of the first storage request block protocol to utilizing storage request blocks in the second format of the second storage request block protocol;
wherein the method is performed by at least one processing device comprising a processor coupled to a memory.

14. The method of claim 13 wherein the first storage request block protocol comprises an extended storage request block protocol and the second storage request block protocol comprises a legacy storage request block protocol.

15. The method of claim 13 wherein determining whether the second storage stack of the second device supports the first storage request block protocol is performed during a path discovery scan operation.

16. The method of claim 13 wherein converting the one or more storage request blocks directed to the data to be migrated from the first format of the first storage request block protocol to the second format of the second storage request block protocol comprises, for a given one of the one or more storage request blocks in the first format of the first storage request block protocol:
allocating a temporary memory structure for a given storage request block in the second format of the second storage request block protocol;
determining a mapping between one or more fields of the first format of the first storage request block protocol and one or more fields of the second format of the second storage request block protocol; and
utilizing the determined mapping to populate, in the allocated temporary memory structure, the one or more fields in the given storage request block in the second format of the second storage request block protocol.

17. A computer program product comprising a non-transitory processor-readable storage medium having stored therein program code of one or more software programs, wherein the program code when executed by at least one processing device causes the at least one processing device to perform steps of:
identifying data to be migrated from a first device to a second device, wherein the first device comprises a first storage stack supporting a first storage request block protocol;
determining whether a second storage stack of the second device supports the first storage request block protocol;
responsive to determining that the second storage stack of the second device does not support the first storage request block protocol, converting one or more storage request blocks directed to the data to be migrated from a first format of the first storage request block protocol to a second format of a second storage request block protocol;
migrating the data from the first device to the second device utilizing one or more input-output operations comprising the one or more storage request blocks in the second format of the second storage request block protocol; and
converting, subsequent to migration of the data from the first device to the second device and until at least one designated stopping condition is triggered, one or more additional input-output operations directed to the migrated data from utilizing storage request blocks in the first format of the first storage request block protocol to utilizing storage request blocks in the second format of the second storage request block protocol.

18. The computer program product of claim 17 wherein the first storage request block protocol comprises an extended storage request block protocol and the second storage request block protocol comprises a legacy storage request block protocol.

19. The computer program product of claim 17 wherein determining whether the second storage stack of the second device supports the first storage request block protocol is performed during a path discovery scan operation.

20. The computer program product of claim 17 wherein converting the one or more storage request blocks directed to the data to be migrated from the first format of the first storage request block protocol to the second format of the second storage request block protocol comprises, for a given one of the one or more storage request blocks in the first format of the first storage request block protocol:
allocating a temporary memory structure for a given storage request block in the second format of the second storage request block protocol;
determining a mapping between one or more fields of the first format of the first storage request block protocol and one or more fields of the second format of the second storage request block protocol; and
utilizing the determined mapping to populate, in the allocated temporary memory structure, the one or more fields in the given storage request block in the second format of the second storage request block protocol.

* * * * *